United States Patent
Fujimaki

(10) Patent No.: US 8,490,180 B2
(45) Date of Patent: Jul. 16, 2013

(54) COMPUTER READABLE MEDIUM, METHOD FOR CONTROLLING EXECUTION OF PROCESSING, AND INFORMATION PROCESSING APPARATUS

(75) Inventor: Yoshihiro Fujimaki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 551 days.

(21) Appl. No.: 12/637,351

(22) Filed: Dec. 14, 2009

(65) Prior Publication Data

US 2010/0325725 A1 Dec. 23, 2010

(30) Foreign Application Priority Data

Jun. 17, 2009 (JP) ................................. 2009-144541

(51) Int. Cl.
*G06F 7/04* (2006.01)
(52) U.S. Cl.
USPC .......................................................... 726/21
(58) Field of Classification Search
USPC ................................ 726/21, 4; 713/168, 193
See application file for complete search history.

(56) References Cited

U.S. PATENT DOCUMENTS 7,194,631 B2 3/2007 Numano
2003/0182586 A1* 9/2003 Numano ....................... 713/202

FOREIGN PATENT DOCUMENTS

JP 2003-280781 A 10/2003

* cited by examiner

*Primary Examiner* — Samson Lemma
(74) *Attorney, Agent, or Firm* — Sughrue Mion, PLLC

(57) ABSTRACT

A computer readable medium storing program causing a computer to execute a process for controlling execution of a processing, the process includes receiving, outputting, and executing. The receiving step receives a first request indicating an execution request of the processing from a user. The outputting step outputs processing correspondence information corresponding to the processing to recording medium when an execution result of the processing at the time of receiving the first request from user to which a first authority is given and a second authority is not given differs from an execution result of the processing at the time of receiving the first request from a user to which the second authority is given in case that the first request is sent from user to which both of the first authority and the second authority are given.

10 Claims, 5 Drawing Sheets

COMPUTER READABLE MEDIUM, METHOD FOR CONTROLLING EXECUTION OF PROCESSING, AND INFORMATION PROCESSING APPARATUS

CROSS-REFERENCE TO RELATED APPLICATIONS

This application is based upon and claims priority under 35 USC 119 from Japanese Patent Application No. 2009-144541, filed Jun. 17, 2009.

BACKGROUND

Technical Field

The present invention relates to a computer readable medium, a method for controlling execution of processing, and an information processing apparatus.

SUMMARY OF THE INVENTION

According to an aspect of the invention, a computer readable medium storing a program causing a computer to execute a process for controlling execution of a processing, the process includes receiving, outputting, and executing. The receiving step receives a first request indicating an execution request of the processing from a user. The outputting step outputs processing correspondence information corresponding to the processing to a recording medium when an execution result of the processing at the time of receiving the first request from a user to which a first authority is given and a second authority is not given differs from an execution result of the processing at the time of receiving the first request from a user to which the second authority is given in case that the first request is sent from a user to which both of the first authority and the second authority are given. The executing step executes the processing based on the processing correspondence information stored in the recording medium according to a second request from a user.

BRIEF DESCRIPTION OF THE DRAWINGS

Exemplary embodiments of the invention will be described in detail based on the following figures, wherein.

DETAILED DESCRIPTION

One exemplary embodiment of the invention will hereinafter be described in detail based on the drawings.

Figure 1:
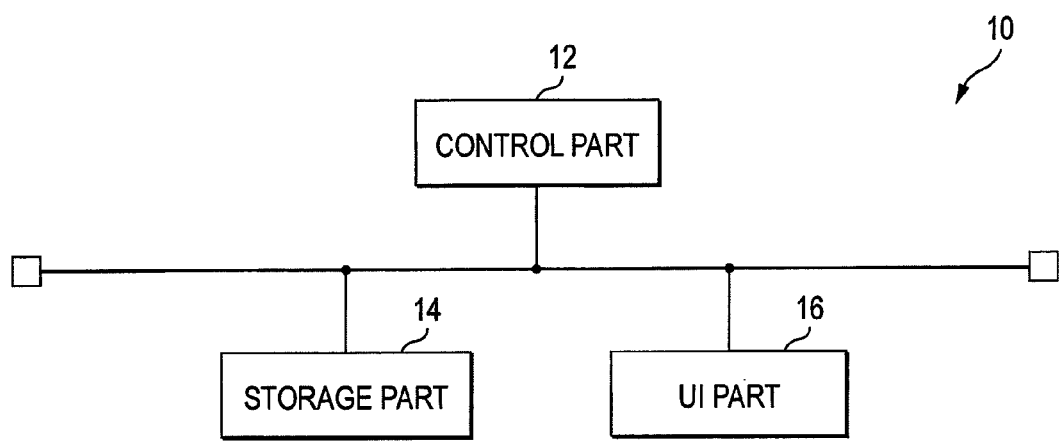
FIG. 1 is a diagram showing one example of a hardware configuration of an information processing apparatus according to one exemplary embodiment of the invention.

As illustrated in a hardware configuration diagram of FIG. 1, an information processing apparatus 10 in the present exemplary embodiment includes, for example, a control part 12, a storage part 14 and a user interface (UI) part 16. These elements are connected through a bus etc.

The control part 12 is a program control device such as a CPU, and operates according to a program installed in the information processing apparatus 10. The storage part 14 is a hard disk, a storage element such as ROM or RAM, etc. A program etc. executed by the control part 12 are stored in the storage part 14. Also, the storage part 14 operates as work memory of the control part 12. The UI part 16 is a display, a microphone, a mouse, a keyboard, etc., and outputs the contents of a manipulation performed by a user or a sound inputted by a user to the control part 12. Also, this UI part 16 outputs sound or display of information according to instructions inputted from the control part 12.

Figure 2:
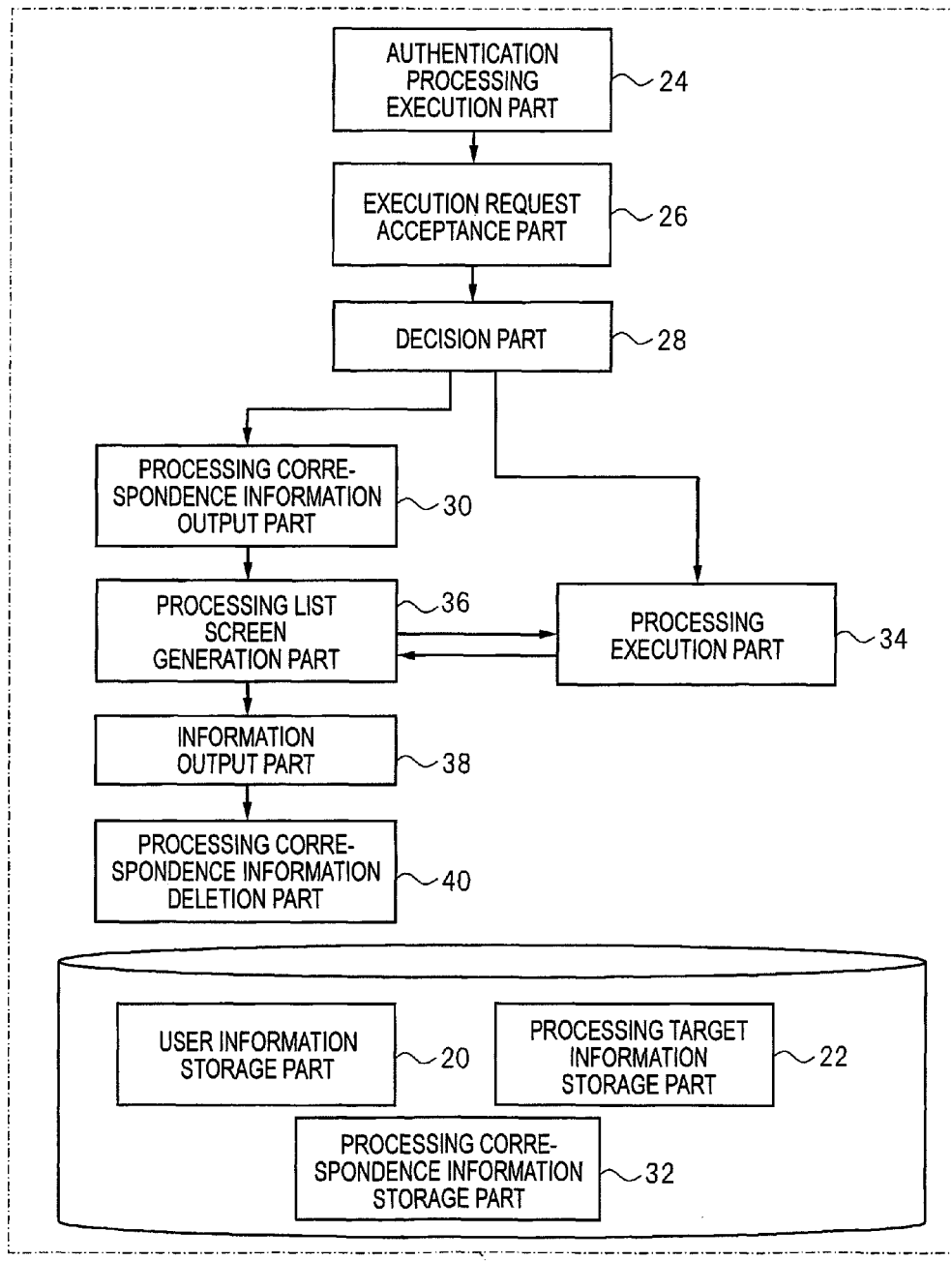
FIG. 2 is a functional block diagram showing one example of a function implemented by the information processing apparatus according to one exemplary embodiment of the invention.

FIG. 2 is a functional block diagram showing one example of a function implemented by the information processing apparatus 10 according to the exemplary embodiment. As illustrated in FIG. 2, in the exemplary embodiment, the information processing apparatus 10 functions as including, for example, a user information storage part 20, a processing target information storage part 22, an authentication processing execution part 24, an execution request acceptance part 26, a decision part 28, a processing correspondence information output part 30, a processing correspondence information storage part 32, a processing execution part 34, a processing list screen generation part 36, an information output part 38, and a processing correspondence information deletion part 40. The user information storage part 20, the processing target information storage part 22 and the processing correspondence information storage part 32 are implemented using the storage part 14 mainly. The other elements are implemented using the control part 12 mainly.

These elements are implemented by executing a program installed in the information processing apparatus 10 which is a computer by the control part 12 of the information processing apparatus 10. This program is supplied to the information processing apparatus 10 through communication means such as the Internet or through a computer-readable information transfer medium such as CD-ROM or DVD-ROM.

Figure 3:
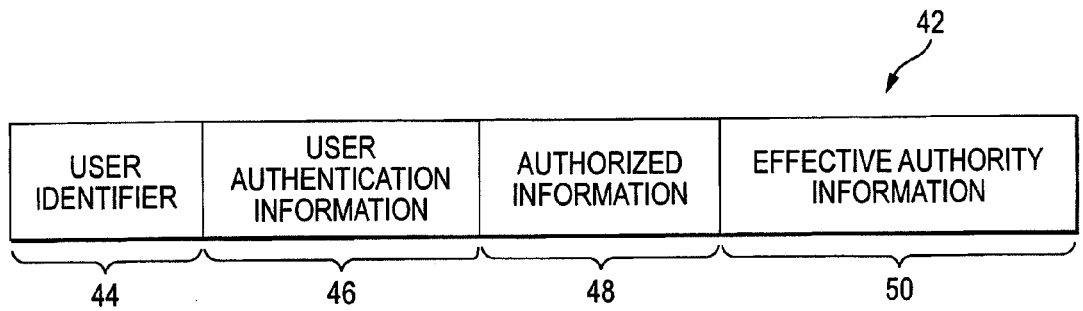
FIG. 3 is a diagram showing one example of a data structure of user information.

In the exemplary embodiment, for example, the user information storage part 20 stores user information 42 illustrated in FIG. 3. FIG. 3 is a diagram showing one example of a data structure of the user information 42. The user information 42 is information indicating a user of the information processing apparatus 10. As illustrated in FIG. 3, the user information 42 includes a user identifier (user ID) which is an identifier of a user, user authentication information 46 which is information (for example, a password) for authenticating a user, authorized information 48 indicating at least one authority given to a user indicated by this user information 42, and effective authority information indicating one authority which becomes effective among authorities indicated by the authorized information 48. A value of the authorized information 48 or the effective authority information 50 is concretely, for example, a "general authority", a "management authority", a "personnel staff" or an "accountant".

Figure 4:
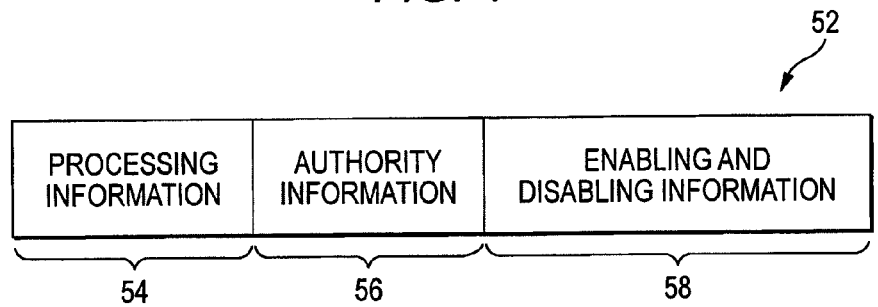
FIG. 4 is a diagram showing one example of a data structure of processing authority relevant information.

In the exemplary embodiment, for example, the processing target information storage part 22 stores processing target information targeted for processing accepted from a user. The processing target information corresponds concretely to, for example, a file or a folder in the case where the information processing apparatus 10 functions as a file server, or a table or a view in the case where the information processing apparatus 10 functions as a database server. Then, in the exemplary embodiment, for example, at least one processing authority relevant information 52 illustrated in FIG. 4 is associated with the processing target information. Then, the processing target information storage part 22 also stores the processing authority relevant information 52.

FIG. 4 is a diagram showing one example of a data structure of the processing authority relevant information 52. The processing authority relevant information 52 indicates whether or not the processing is executed (execution is enabled or disabled) according to an execution request to processing target information accepted from a user having, for example, a certain authority. Thus, the processing authority relevant information 52 indicates, for example, a relationship between processing and authority. As illustrated in FIG. 4, the processing authority relevant information 52 includes, for example, processing information 54, authority information 56, and enabling and disabling information 58. The processing information 54 indicates processing (for example, "generation of a file", "change of a file name", "deletion of a file" or "deletion of a folder (for example, may mean batch deletion of a folder and files of the inside of its folder)") executed to processing target information. Also, the processing information 54 may include, for example, an argument (for example, a path of a folder targeted for deletion or a file name of a file targeted for generation) in the case of executing processing indicated by the processing information 54. The authority information 56 indicates, for example, an authority (for example, a general authority or a management authority) targeted for enabling or disabling of processing indicated by the processing information 54. The enabling and disabling information 58 indicates whether or not processing indicated by the processing information 54 is enabled (or disabled) with respect to a user having an authority indicated by the authority information 56. A value of the enabling and disabling information 58 is, for example, "enabling" or "disabling". For example, the processing authority relevant information 52 including the processing information 54 whose value is "deletion of a folder (hereinafter called a folder X) with a name of X", the authority information 56 whose value is "management authority" and the enabling and disabling information 58 whose value is "enabling" indicates that a user to which the management authority is given is enabled to delete the folder X.

The authentication processing execution part 24 executes authentication processing of a user of the information processing apparatus 10. The authentication processing execution part 24 accepts a use request (for example, a login request) for the information processing apparatus 10 associated with combination of the user identifier 44 and the user authentication information 46 (for example, a password) from a user through the UI part 16 such as a keyboard or a mouse. Then, the authentication processing execution part 24 decides whether or not this user is enabled to use the information processing apparatus 10 based on combination of the user identifier 44 and the user authentication information 46 accepted. The authentication processing execution part 24 concretely enables use of the information processing apparatus 10 by this user, for example, when the user information 42 including the user identifier 44 and the user authentication information 46 included in the use request is stored in the user information storage part 20. Then, in the case of enabling use of the information processing apparatus 10 by this user, the authentication processing execution part 24 outputs a message to that effect to the UI part 16 such as a display. In this manner, the use of the information processing apparatus 10 by the user is started in the exemplary embodiment.

The execution request acceptance part 26 accepts an execution request for processing from a user (for example, a user authenticated by the authentication processing execution part 24). The execution request is associated with, for example, the user identifier 44 of the user authenticated by the authentication processing execution part 24. For example, the execution request acceptance part 26 accepts an execution request for processing such as generation, change or deletion of processing target information stored in the processing target information storage part 22.

Figure 5:
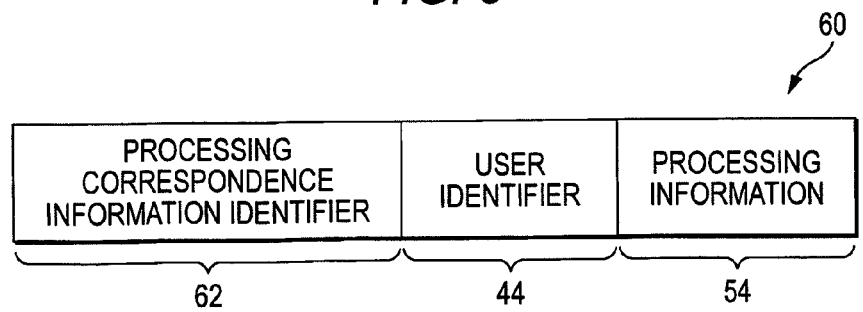
FIG. 5 is a diagram showing one example of a data structure of processing correspondence information.

The decision part 28 decides whether the processing execution part 34 is made to execute processing based on an execution request accepted by the execution request acceptance part 26 or the processing correspondence information output part 30 is made to execute an output of processing correspondence information 60 (see FIG. 5) corresponding to processing in which the execution request acceptance part 26 accepts an execution request based on a predetermined criterion (as to whether or not an execution result of the processing executed according to an execution request accepted from a user to which a second authority (for example, a management authority) is given (for example, a user to which a first authority (for example, a general authority) and the second authority (for example, a management authority) are given or a user to which the second authority (for example, a management authority) is given and the first authority (for example, a general authority) is not given) differs from an execution result of the processing executed according to an execution request of processing accepted from a user to which the first authority (for example, a general authority) is given and the second authority (for example, a management authority) is not given in the case where the execution request acceptance part 26 accepts an execution request of processing from a user to which the first authority (for example, a general authority) and the second authority (for example, a management authority) are given) according to an execution request of processing accepted by the execution request acceptance part 26. FIG. 5 is a diagram showing one example of a data structure of the processing correspondence information 60. Details of the processing correspondence information 60 will be described below.

The processing correspondence information output part 30 outputs the processing correspondence information 60 corresponding to the processing to the processing correspondence information storage part 32 when an execution result of the processing executed according to an execution request accepted from a user to which a second authority (for example, a management authority) is given differs from an execution result of the processing executed according to an execution request of processing accepted from a user to which a first authority (for example, a general authority) is given and the second authority (for example, a management authority) is not given in the case where the execution request acceptance part 26 accepts an execution request of processing from a user to which the first authority (for example, a general authority) and the second authority (for example, a management authority) are given. In the exemplary embodiment, the processing correspondence information output part 30 outputs the processing correspondence information 60 to the processing correspondence information storage part 32 when the decision part 28 decides that the processing correspondence information output part 30 is made to execute an output of the processing correspondence information 60. Then, the processing correspondence information storage part 32 stores the processing correspondence information 60. As illustrated in FIG. 5, the processing correspondence information 60 includes, for example, a processing correspondence information identifier (processing correspondence information ID) 62 which is an identifier of the processing correspondence information 60, a user identifier 44 of a user which makes an execution request of processing, and processing information 54 indicating processing (for example, deletion of a folder X) in which execution is requested to processing target information. This processing information 54 may include an argument in the case of executing processing indicated by the processing information 54 in a manner similar to the processing information 54 included in the processing authority relevant information 52.

In the exemplary embodiment, for example, the processing execution part 34 executes processing based on the processing correspondence information 60 stored in the processing correspondence information storage part 32. Also, in the exemplary embodiment, for example, the processing execution part 34 executes processing based on a relationship between processing corresponding to the processing correspondence information 60 stored in the processing correspondence information storage part 32 and processing in which the execution request acceptance part 26 accepts an execution request. Also, in the exemplary embodiment, for example, the processing execution part 34 accepts a change request for an effective authority from a user and changes the effective authority information 50 included in the user information 42.

Figure 6:
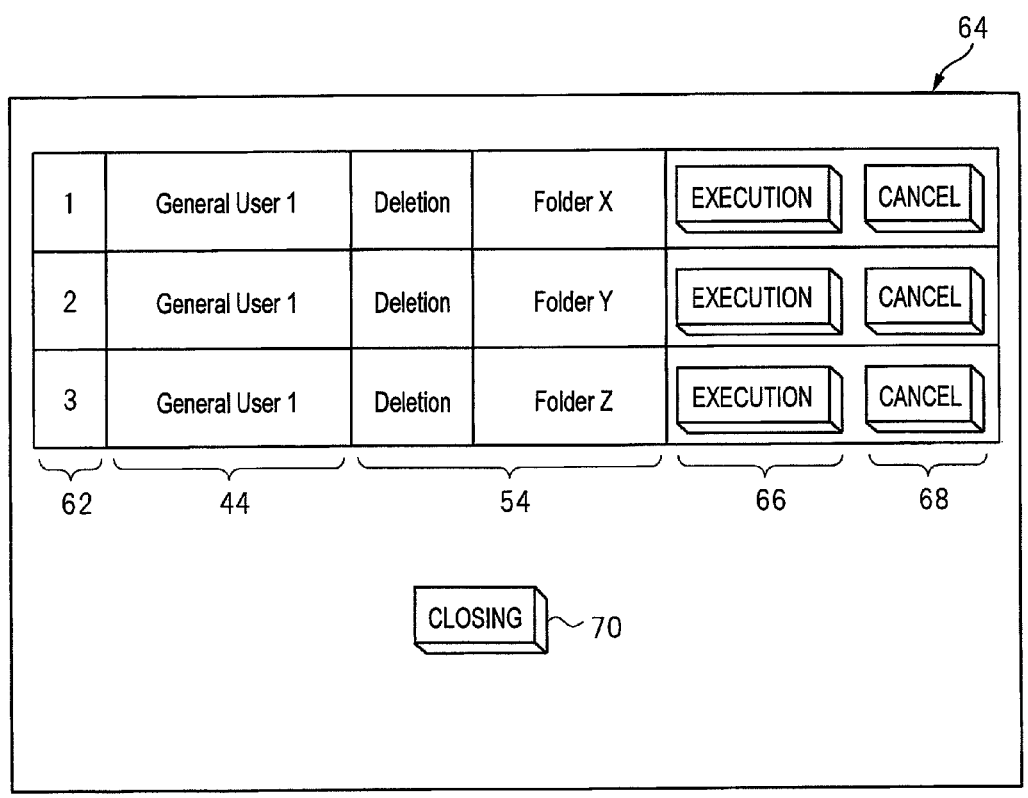
FIG. 6 is a diagram showing one example of a processing list screen.

The processing list screen generation part 36 generates a processing list screen 64 indicating at least one processing as a list based on processing correspondence information 60 (for example, processing correspondence information 60 including the user identifier 44 of a user which makes an execution request of processing) stored in the processing correspondence information storage part 32. FIG. 6 is a diagram showing one example of the processing list screen 64. The processing list screen 64 includes the processing correspondence information identifier (processing correspondence information ID) 62, the user identifier 44 and the processing information 54 (an argument and a command corresponding to the processing information 54 are divided and displayed in an example of FIG. 6) included in the processing correspondence information 60 stored in the processing correspondence information storage part 32. Then, the processing list screen 64 includes an execution button 66 and a cancel button 68 corresponding to each of the processing correspondence information 60. Also, the processing list screen 64 includes a closing button 70.

The information output part 38 outputs information generated based on at least one processing correspondence information 60 stored in the processing correspondence information storage part 32. In the exemplary embodiment, for example, the information output part 38 displays and outputs the processing list screen 64 to the UI part 16 such as a display.

The processing correspondence information deletion part 40 deletes the processing correspondence information 60. In the exemplary embodiment, for example, the processing correspondence information deletion part 40 deletes the processing correspondence information 60 stored in the processing correspondence information storage part 32 according to a request from a user.

Figure 7:
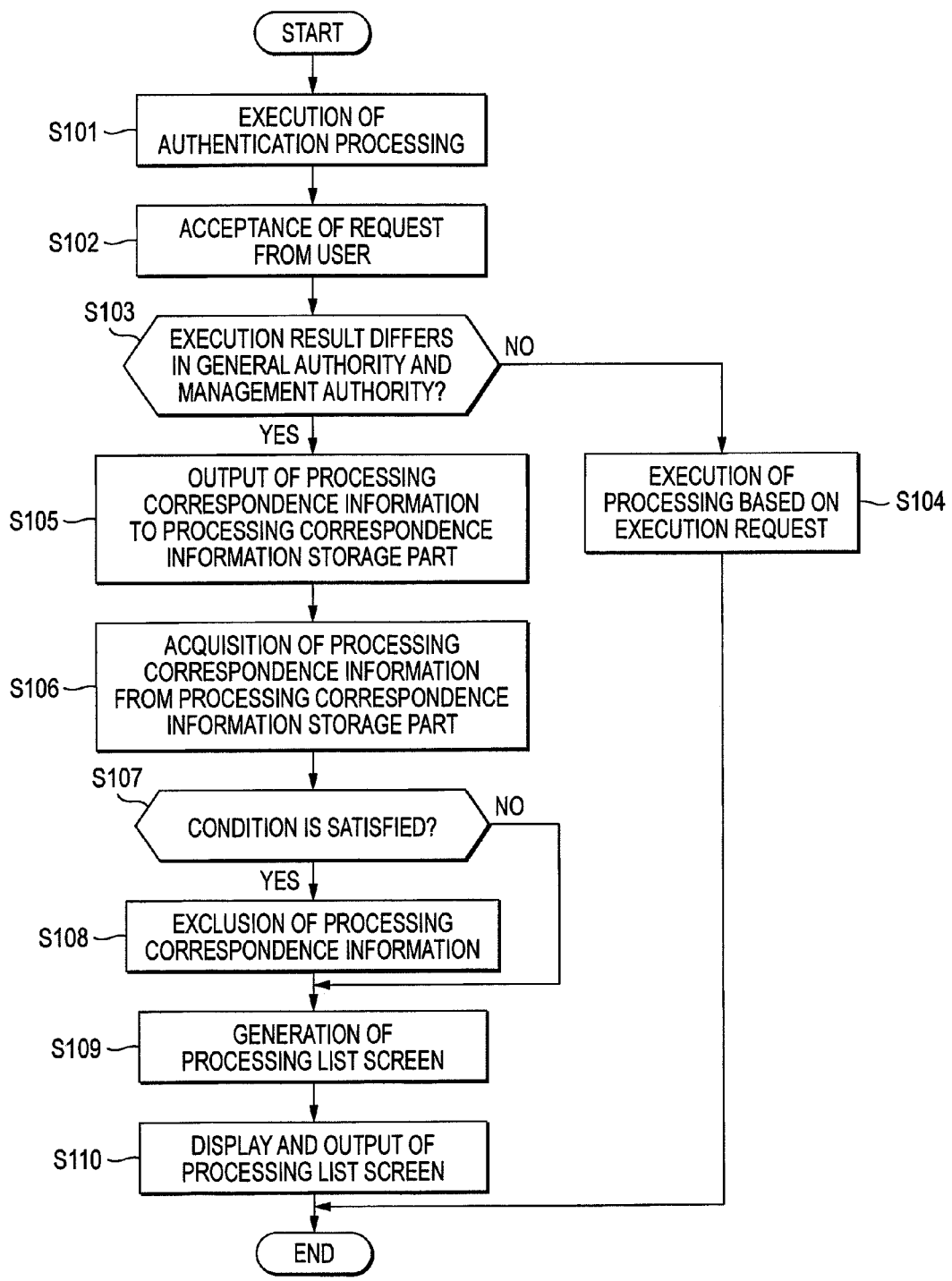
FIG. 7 is a flow diagram showing one example of a flow of processing performed in the information processing apparatus according to the exemplary embodiment.

One example of a flow of processing performed in the information processing apparatus 10 according to the exemplary embodiment will herein be described with reference to a flow diagram illustrated in FIG. 7.

First, the authentication processing execution part 24 accepts a use request for the information processing apparatus from a user, having an effective authority of a general authority, to which a general authority and a management authority are given, and executes authentication processing (S101). Then, the execution request acceptance part 26 accepts a request for deletion of a folder X from a user authenticated in the processing illustrated in S101 (S102).

Then, the decision part 28 decides whether or not an execution result of deletion of the folder X by a user to which both of a general authority and a management authority are given differs from an execution result of deletion of the folder X by a user to which the general authority is given and the management authority is not given (S103). In addition, the decision part 28 may decide whether or not an execution result of deletion of the folder X by a user to which a management authority is given and a general authority is not given differs from an execution result of deletion of the folder X by a user to which the general authority is given and the management authority is not given. Here, the decision part 28 may decide whether or not execution results differ by simulating the case of executing processing by respective authorities. Also, the decision part 28 may decide whether or not execution results differ by actually executing the processing by respective authorities and checking the execution results and executing processing for canceling the processing. Also, for example, the decision part 28 may make the decision described above based on the processing authority relevant information 52 associated with processing target information (folder X). Concretely, for example, the decision part 28 decides that the execution results described above differ when the processing authority relevant information 52 indicating that a user to which a management authority is given is enabled to delete the folder X is associated with the folder X and the processing authority relevant information 52 indicating that a user to which a general authority is given is enabled to delete the folder X is not associated with the folder X (or the processing authority relevant information 52 indicating that a user to which a general authority is given is disabled to delete the folder X is associated). Thus, the decision part 28 may decide whether or not an execution availability of processing by a user to which a management authority is given differs from an execution availability of processing by a user to which a general authority is given and the management authority is not given.

In the case of deciding that the execution result corresponds (for example, the execution availability corresponds) (that is, in the case of deciding that the execution result does not differ) (S103: N), the processing execution part 34 executes processing based on an execution request (S104). Concretely, for example, when both of a user to which a management authority is given and a user to which a general authority is given are enabled to delete the folder X, the processing execution part 34 deletes the folder X. On the other hand, for example, when both of a user to which a management authority is given and a user to which a general authority is given are not enabled to delete the folder X, the processing execution part 34 displays and outputs a message to the effect that the folder X cannot be deleted to the UI part 16 such as a display. Then, the processing is ended.

In the case of deciding that the execution result differs (for example, the execution availability differs) (S103: Y), the processing correspondence information output part 30 outputs the processing correspondence information 60 (for example, the processing correspondence information 60 including the processing information 54 whose value is "deletion of the folder X") corresponding to deletion of the folder X to the processing correspondence information storage part 32 (S105).

Then, the processing list screen generation part 36 acquires at least one processing correspondence information 60 stored in the processing correspondence information storage part 32 (S106). Then, the processing execution part 34 checks whether or not a relationship between processing indicated by each of the processing correspondence information 60 stored in the processing correspondence information storage part 32 and processing (that is, processing indicated by the processing correspondence information 60 outputted to the processing correspondence information storage part 32 by the processing illustrated in S105) in which the execution request acceptance part 26 accepts an execution request in the processing illustrated in S102 satisfies a predetermined condition (for example, a condition of mutually the same (or corresponding) processing, a condition of mutually incompatible processing or a condition of mutually contradictory processing) (S107). More concretely, for example, the processing execution part 34 checks whether or not the processing in which the execution request acceptance part 26 accepts the execution request corresponds to the processing indicated by at least one of the processing correspondence information 60 stored in the processing correspondence information storage part 32 already (for example, whether or not both the processing indicate deletion of the folder X). In addition, the processing execution part 34 may be constructed so as to check whether or not the processing is mutually incompatible processing or mutually contradictory processing, for example, one processing indicates deletion of the folder X and the other processing indicates movement of a file of the inside of the folder X.

Then, in the case of checking that the condition is satisfied (S107: Y), the processing execution part 34 excludes the processing correspondence information 60 (for example, the processing correspondence information 60 added to the processing correspondence information storage part 32 by the processing illustrated in S105 or the processing correspondence information 60 stored in the processing correspondence information storage part 32 in the case of deciding that the condition is satisfied in a relationship with this processing correspondence information 60) in which the condition is satisfied among the processing correspondence information 60 acquired by the processing illustrated in S106 from a target of subsequent processing (S108). At this time, the processing correspondence information deletion part 40 may delete this processing correspondence information 60 from the processing correspondence information storage part 32. Also, in the processing illustrated in S108, the processing execution part 34 may display and output a warning screen (for example, a message to the effect that the processing corresponds (conflicts) or contradicts) to the UI part 16 such as a display together with exclusion of the processing correspondence information 60 (or instead of exclusion).

Then, in the case of checking that the condition is not satisfied in the processing illustrated in S107 (S107: N) or after the processing illustrated in S108 is ended, the processing list screen generation part 36 generates the processing list screen 64 illustrated in FIG. 6 based on the processing correspondence information 60 acquired by the processing illustrated in S106 (S109). Then, the information output part 38 displays and outputs this processing list screen 64 to the UI part 16 such as a display (S110).

When the information processing apparatus 10 accepts a manipulation of depressing the execution button 66 from a user in the case of displaying and outputting the processing list screen 64 to the UI part 16, the processing execution part 34 executes processing (for example, deletion processing of the folder X) based on the processing correspondence information 60 corresponding to its execution button 66. Thus, in the exemplary embodiment, for example, the processing execution part 34 executes processing based on the processing correspondence information 60 (for example, the processing correspondence information 60 selected by a user) stored in the processing correspondence information storage part 32 according to a request from a user.

When the information processing apparatus 10 accepts a manipulation of depressing the cancel button 68 from a user in the case of displaying and outputting the processing list screen 64 to the UI part 16, the processing correspondence information deletion part 40 deletes the processing correspondence information 60 corresponding to its cancel button 68 from the processing correspondence information storage part 32.

When the information processing apparatus 10 accepts a manipulation of depressing the closing button 70 from a user in the case of displaying and outputting the processing list screen 64 to the UI part 16, the information output part 38 erases the processing list screen 64 from the UI part 16 (for example, a screen without including the processing list screen 64 is displayed and outputted to the UI part 16).

In addition, the processing performed in the information processing apparatus 10 according to the exemplary embodiment is not limited to the processing example described above.

For example, it may be decided whether or not processing in which the execution request acceptance part 26 accepts an execution request previously before the processing illustrated in S103 described above is processing enabled in a user to which an authority corresponding to an effective authority of the user of a request source of processing is given. Concretely, for example, the decision part 28 may decide whether or not a user to which a management authority which is an effective authority of the user of a request source is given is enabled to delete the folder X. Then, when the decision part 28 decides that the effective authority of the user of the request source of processing is the management authority and this user is enabled to delete the folder X, it may be constructed so as to execute the processing illustrated in S104. On the other hand, when the decision part 28 decides that the effective authority of the user of the request source of processing is a general authority and this user is not enabled to delete the folder X, it may be constructed so as to execute the processing illustrated in S103.

Thus, the decision part 28 may be constructed so as to decide whether or not an execution result of deletion of the folder X by a user to which a management authority is given differs from an execution result of deletion of the folder X by a user to which a general authority is given in the case where execution of processing by a user to which an effective authority is given is not enabled. Also, the processing correspondence information output part 30 may be constructed so as to output the processing correspondence information 60 described above to the processing correspondence information storage part 32 when an execution result of deletion of the folder X by a user to which both of a general authority and a management authority are given (or a user to which the management authority is given and the general authority is not given) differs from an execution result of deletion of the folder X by a user to which the general authority is given and the management authority is not given in the case where execution of processing by a user to which an authority corresponding to an effective authority is given is not enabled. Of course, the processing correspondence information output part 30 may be constructed so as to output the processing correspondence information 60 described above to the processing correspondence information storage part 32 when an execution result of deletion of the folder X by a user to which both of a general authority and a management authority are given (or a user to which the management authority is given and the general authority is not given) differs from an execution result of deletion of the folder X by a user to which the general authority is given and the management authority is not given in the case where execution of processing by a user to which the general authority is given is enabled.

Also, for example, the processing illustrated in S107 described above may be executed before the processing illustrated in S105 described above. Then, in the case of checking that the condition is satisfied by the processing illustrated in S107, the processing correspondence information output part 30 may be constructed so as not to output the processing correspondence information 60 (for example, the processing correspondence information 60 including the processing information 54 whose value is "deletion of the folder X") corresponding to deletion of the folder X to the processing correspondence information storage part 32 (for example, so as to suppress an output to the processing correspondence information storage part 32).

Also, for example, the processing illustrated in S108 described above is not executed in the case of checking that the condition is satisfied in the processing illustrated in S107 described above, and it may be constructed so as to execute the processing illustrated in S108 described above in the case of checking that the condition is not satisfied.

In addition, the invention is not limited to the exemplary embodiment described above.

For example, when the execution request acceptance part accepts processing (for example, the same processing) corresponding to processing stored in the processing correspondence information storage part 32, the processing execution part 34 may be constructed so as to display and output a message to the effect that its processing is not executed to the UI part 16 such as a display.

Also, for example, the processing correspondence information output part 30 may output the processing correspondence information 60 (for example, the processing correspondence information 60 indicating an identifier etc. of a file remaining without being deleted in the case of executing deletion of the folder X) to the processing correspondence information storage part 32. Then, the processing execution part 34 may be constructed so as to execute processing so as to correspond to an execution result indicated by the processing correspondence information 60 (for example, execute deletion of a file other than a file corresponding to an identifier indicated by the processing correspondence information 60).

Also, for example, it may be constructed so that a request for display and output of the processing list screen 64 is accepted from a user and according to its request for display and output, the processing list screen generation part generates the processing list screen 64 based on the processing correspondence information 60 (for example, the processing correspondence information 60 including the user identifier 44 of a user by which the request for display and output is made) stored in the processing correspondence information storage part 32 and the information output part 38 displays and outputs its processing list screen 64 to the UI part 16 such as a display.

Also, for example, the exemplary embodiment may be applied to a distributed information processing system in which at least a part of the user information storage part 20, the processing target information storage part 22 and the authentication processing execution part 24 are implemented in an external apparatus connected by communication means such as the Internet and the information processing apparatus 10.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for controlling execution of applying processing to electronic information, the process comprising:
   receiving a first request indicating an execution request of the processing from a first user to which both of a first authority and a second authority are given;
   deferring executing the processing according to the first request from the first user and outputting processing correspondence information corresponding to the processing to a storage part when an execution result of the processing at the time of receiving the first request from a second user to which a first authority is given and a second authority is not given differs from an execution result of the processing at the time of receiving the first request from the first user; and
   executing the processing based on the processing correspondence information stored in the storage part according to a second request from the first user,
   wherein a processing content according to the first request and a processing content according to the second request is a same processing content of the electronic information, and
   wherein the process either defers executing the processing according to the first request from the first user or does not defer executing the processing according to the first request from the first user in accordance with cases.

2. The non-transitory computer readable medium according to claim 1, wherein, in the outputting step, the processing correspondence information is output to the storage part when an execution availability of the processing at the time of receiving the first request from the second user differs from an execution availability of the processing at the time of receiving the first request from the first user.

3. The non-transitory computer readable medium according to claim 1, wherein the first request is associated with the first authority or the second authority, and
   the processing correspondence information is output when execution of the processing by the second user to which an authority associated with the first request is given is disabled in the outputting step.

4. The non-transitory computer readable medium according to claim 1, wherein the first request is associated with the first authority or the second authority, and
   the processing correspondence information is output when execution of the processing by the second user to which an authority associated with the first request is given is enabled in the outputting step.

5. The non-transitory computer readable medium according to claim 1, wherein, in the executing step, a processing is executed based on a relationship between processing corresponding to processing correspondence information outputted in the outputting step and processing for receiving the first request.

6. The non-transitory computer readable medium according to claim 1, wherein the process further comprises deleting the processing correspondence information stored in the storage part according to a third request from the first user.

7. The non-transitory computer readable medium according to claim 1, wherein at least one processing correspondence information stored in the storage part is selected by the first user and a process corresponding to the selected processing correspondence information is executed.

8. The non-transitory computer readable medium according to claim 1, wherein the process further comprises outputting information generated based on at least one of processing correspondence information stored in the recording medium.

9. An information processing apparatus comprising:
a receiving unit that receives a first request indicating an execution request of processing from a first user to which both of a first authority and a second authority are given;
an output unit that defers executing the processing according to the first request from the first user and outputs processing correspondence information corresponding to the processing to a storage part when an execution result of processing at the time of receiving the first request from a second user to which a first authority is given and a second authority is not given differs from an execution result of processing at the time of receiving the first request from the first user; and
an execution unit that executes the processing based on the processing correspondence information stored in the storage part according to a second request from the first user,
wherein a processing content according to the first request and a processing content according to the second request is a same processing content of the electronic information, and
wherein at least one of the receiving unit, the output unit, and the execution unit is processed by a processor, and
wherein the process either defers executing the processing according to the first request from the first user or does not defer executing the processing according to the first request from the first user in accordance with cases.

10. A method for controlling a processing to electronic information, the method comprising:
receiving a first request indicating an execution request of the processing from a first user to which both of a first authority and a second authority are given;
deferring executing the processing according to the first request from the first user and outputting processing correspondence information corresponding to the processing to a storage part when an execution result of the processing at the time of receiving the first request from a second user to which a first authority is given and a second authority is not given differs from an execution result of the processing at the time of receiving the first request from the first user; and
executing the processing based on the processing correspondence information stored in the storage part according to a second request from the first user,
wherein a processing content according to the first request and a processing content according to the second request is a same processing content of the electronic information, and
wherein at least one of the receiving, the outputting, and the executing is processed by a processor, and
wherein the process either defers executing the processing according to the first request from the first user or does not defer executing the processing according to the first request from the first user in accordance with cases.

* * * * *